(12) United States Patent
Olaya et al.

(10) Patent No.: US 10,522,154 B2
(45) Date of Patent: Dec. 31, 2019

(54) VOICE SIGNATURE FOR USER AUTHENTICATION TO ELECTRONIC DEVICE

(71) Applicant: Google LLC, Mountain View, CA (US)

(72) Inventors: Sergio Olaya, Mountain View, CA (US); Dmitry Shapiro, Spring Valley, CA (US)

(73) Assignee: Google LLC, Mountain View, CA (US)

( * ) Notice: Subject to any disclaimer, the term of this patent is extended or adjusted under 35 U.S.C. 154(b) by 78 days.

(21) Appl. No.: 15/598,998

(22) Filed: May 18, 2017

(65) Prior Publication Data

US 2018/0233152 A1 Aug. 16, 2018

Related U.S. Application Data

(60) Provisional application No. 62/458,146, filed on Feb. 13, 2017.

(51) Int. Cl.
| | |
|---|---|
| *G10L 17/00* | (2013.01) |
| *G10L 17/24* | (2013.01) |
| *G10L 15/22* | (2006.01) |
| *H04W 12/06* | (2009.01) |
| *H04L 29/06* | (2006.01) |
| *G06F 21/32* | (2013.01) |

(Continued)

(52) U.S. Cl.
CPC .............. *G10L 17/24* (2013.01); *G10L 15/22* (2013.01); *H04L 63/083* (2013.01); *H04L 63/0861* (2013.01); *H04W 12/06* (2013.01); *G06F 21/31* (2013.01); *G06F 21/32* (2013.01); *G10L 17/26* (2013.01); *H04L 67/306* (2013.01)

(58) Field of Classification Search
None
See application file for complete search history.

(56) References Cited

U.S. PATENT DOCUMENTS 5,127,043 A 6/1992 Hunt et al.
7,797,549 B2 * 9/2010 Main ...................... G06F 21/14
340/5.26

(Continued)

OTHER PUBLICATIONS

International Search Report and Written Opinion dated Jan. 28, 2018 in Application No. PCT/US2017/056970.

*Primary Examiner* — Richard Z Zhu
(74) *Attorney, Agent, or Firm* — Lerner, David, Littenberg, Krumholz & Mentlik, LLP

(57) ABSTRACT

An authentication application receives an audio input, detects whether the audio input matches a known passphrase, and processes the audio input to determine whether the audio input is consistent with a known voice signature. Upon determining that the audio input is consistent with the known voice signature, the application will identify a user who is associated with the voice signature. The device will output an audio prompt, receive a spoken answer, and analyze the spoken answer to determine whether it corresponds to an expected response. Outputting the prompt may responsive to determining that the user was not authenticated to the device or the application within a threshold time period, or if a security threat was posted to the user's profile, When the system determines that the spoken answer corresponds to the expected response, it will authenticate the user and provide the user with access to the device or application.

20 Claims, 5 Drawing Sheets

(51) Int. Cl.
*G06F 21/31* (2013.01)
*G10L 17/26* (2013.01)
*H04L 29/08* (2006.01)

(56) References Cited

U.S. PATENT DOCUMENTS

| | | | |
|---|---|---|---|
| 8,190,437 B2* | 5/2012 | Farrell | G10L 17/04 |
| | | | 704/246 |
| 8,694,315 B1* | 4/2014 | Sheets | G06Q 20/40145 |
| | | | 704/246 |
| 8,959,360 B1 | 2/2015 | Barra | |
| 9,077,713 B1* | 7/2015 | Zheng | H04W 12/00 |
| 9,191,382 B1 | 11/2015 | Hornung et al. | |
| 9,262,612 B2 | 2/2016 | Cheyer | |
| 9,396,316 B1 | 7/2016 | Altman | |
| 9,398,128 B2 | 7/2016 | Brunn et al. | |
| 9,412,382 B2 | 8/2016 | Schroeter | |
| 9,531,727 B1* | 12/2016 | Himberger | H04L 63/102 |
| 9,578,023 B2 | 2/2017 | Popovich et al. | |
| 9,584,548 B2 | 2/2017 | Takehi | |
| 9,595,260 B2 | 3/2017 | Shen et al. | |
| 9,602,483 B2 | 3/2017 | Slaby et al. | |
| 9,697,341 B1* | 7/2017 | Liu | G06F 21/45 |
| 9,985,991 B2* | 5/2018 | Elias | H04L 63/20 |
| 2003/0046072 A1* | 3/2003 | Ramaswamy | G06F 17/2881 |
| | | | 704/240 |
| 2004/0162726 A1 | 8/2004 | Chang | |
| 2009/0319270 A1* | 12/2009 | Gross | G10L 15/22 |
| | | | 704/246 |
| 2011/0191838 A1* | 8/2011 | Yanagihara | G06F 15/16 |
| | | | 726/7 |
| 2013/0006626 A1* | 1/2013 | Aiyer | G06F 21/32 |
| | | | 704/235 |
| 2014/0095884 A1* | 4/2014 | Kannavara | G06F 21/32 |
| | | | 713/186 |
| 2014/0172430 A1 | 6/2014 | Rutherford et al. | |
| 2014/0380475 A1 | 12/2014 | Canning et al. | |
| 2015/0326556 A1* | 11/2015 | Vadura | H04L 63/0815 |
| | | | 726/4 |
| 2017/0124313 A1* | 5/2017 | Mann | G06F 21/32 |
| 2018/0226079 A1* | 8/2018 | Khoury | G06F 21/32 |

* cited by examiner

VOICE SIGNATURE FOR USER AUTHENTICATION TO ELECTRONIC DEVICE

RELATED APPLICATIONS AND CLAIM OF PRIORITY

This patent document claims priority to U.S. Provisional Patent Application No. 62/458,146, filed Feb. 13, 2017, the disclosure of which is fully incorporated into this document by reference.

BACKGROUND

Voice activation of electronic devices is growing in popularity. Currently, voice activation requires that each electronic device be trained to recognize the user's voice. Although a user's voice prompts could be stored on a remote server, there could be some delay in authentication and extra data use caused by the remote processing. In addition, some users may prefer that remote storage of their recorded voice not occur at all.

Although physical keys exist that can store biometric data and use the stored data to authenticate a user to an electronic device, physical keys can be misplaced or lost. In addition, there are limited ways to use physical keys to authenticate users on many types of electronic devices.

In addition, certain electronic devices such as digital home assistants may be accessed by multiple users, some of whom may use the same or similar passphrases. When different users access the same device, it is desirable to know which user is accessing the device so that the system can access the correct user's profile and provide a personalized usage experience to the user.

This disclosure describes improved methods and systems for verifying the identity of an account user by voice across multiple electronic devices.

SUMMARY

In various embodiments, a method of authenticating a user to an electronic device includes, by a processor of the electronic device, executing an authentication application by: (a) causing a microphone of the electronic device to receive a spoken audio input; (b) analyzing the spoken audio input to detect whether the spoken audio input matches a known passphrase; and (c) processing the spoken audio input to determine whether the audio input is consistent with a known voice signature. Upon determining that the spoken audio input is consistent with the known voice signature, the processor will identify a user who is associated with the known voice signature.

The system may determine whether the user was previously authenticated to the electronic device, or to an application of the electronic device, within a threshold time period. Alternatively or in addition, the system may determine whether a security threat has been posted to the user's system usage profile. If the processor determines that the user was not previously authenticated to the electronic device or the application within the threshold time period, or if an indication of a security threat has been posted to the user's profile, or upon detection of other determined conditions, the system will: (i) cause the electronic device to output an audio prompt with an expected response; (ii) cause the microphone to receive a spoken answer in response to the audio prompt; (iii) analyze the spoken answer to determine whether the spoken answer corresponds to the expected response; and (iv) after determining that the spoken answer corresponds to the expected response, authenticate the user and provide the user with access to the electronic device or the application.

Before providing the user with access, in response to detecting that the spoken answer corresponds to the expected response, the processor may process the audio input to determine whether the spoken answer is consistent with the known voice signature. If so, it may only provide the user with the access if the spoken answer is consistent with the known voice signature.

In some embodiments, processing the spoken audio input to determine whether the spoken audio input is consistent with the known voice signature may include identifying one or more user profiles that include the spoken audio input, selecting each user that is associated with one of the identified one or more user profiles as a candidate user, and comparing the spoken audio input with voice signatures of each of the candidate users to identify a candidate user whose voice signature is consistent with the spoken audio input.

Optionally, before processing the spoken audio input to determine whether the audio input is consistent with the known voice signature, the system may generate the known voice signature by executing a voice signature generation application that: (a) requests the user to speak a known text passage; (b) receives a spoken audio instance of the known text passage; (c) processes the spoken audio instance to generate the known voice signature; (d) transmits the known voice signature to a remote server for storage; and (e) deletes or does not save any audio recording of the spoken audio instance.

Optionally, before processing the spoken audio input to determine whether the audio input is consistent with the known voice signature, the system may generate the known voice signature by executing a voice signature generation application that: (a) outputs a query; (b) receives a spoken response to the query; (c) processes the spoken response to yield the known voice signature; (d) transmits the known voice signature to a remote server for storage; and (e) deletes or does not save any audio recording of the spoken response so that the spoken audio instance is not saved on the electronic device (although it may be saved at the remote server).

Optionally, the electronic device that executes the authentication application and the electronic device that executes the voice signature generation application may be separate physical devices. Alternatively, they may be the same device or components of the same device.

Optionally, before analyzing the spoken answer to determine whether the spoken answer corresponds to the expected response, the system may generate a profile for the user by outputting queries, receiving replies to the queries, processing the replies to identify text contained in each of the replies, and saving to a remote server a profile comprising the identified text for each reply in association with the reply's corresponding query. When causing the electronic device to output the audio prompt, the system may randomly select one of the queries from the profile. When analyzing the spoken answer to determine whether the spoken answer corresponds to the expected response, the system may determine whether the spoken answer corresponds to the identified text for the reply that corresponds to the selected query.

To determine whether a user's system usage profile includes an indication of a security threat, the system may determine whether the system usage profile includes one or more of the following: (i) an attempt to simultaneously access an application on more than a threshold number of devices at the same time; (b) an attempt to simultaneously use multiple devices in different geographic locations at the same time; or (c) an attempt to access an application or service that is inconsistent with a typical usage pattern for the user.

In other embodiments, an electronic device user authentication system includes an electronic device having a microphone, a speaker and a memory containing an authentication application. When executed, the authentication application will cause a microphone of the electronic device to receive a spoken audio input, cause one or more processors to analyze the audio input to detect whether the audio input matches a spoken passphrase, and cause one or more processors to process the audio input to determine whether the audio input is consistent with a known voice signature. Upon determining that the audio input matches the spoken passphrase and is consistent with the known voice signature, the system will identify a user who is associated with the known voice signature. The system may access a profile for the user to determine whether the profile includes either (a) an indication of a security threat, or (b) an indication that the user was not previously authenticated to the electronic device or to a selected application of the electronic device within a threshold time period. The speaker of the electronic device will output an audio prompt with an expected response. Optionally, outputting the audio prompt is done in response to determining that the system usage profile includes an indication of a security threat or an indication that the user was not previously authenticated within the threshold time period. After the microphone receives a spoken answer to the audio prompt, the system will analyze the spoken answer to determine whether the spoken answer corresponds to the expected response. If the system can determine that the spoken answer corresponds to the expected response, the system will authenticate the user so that the user may access one or more functions of the electronic device.

Optionally, the portion of the system that processes the audio input to determine whether the audio input is consistent with a known voice signature may be one or more components of a server that is remote from the electronic device and in communication with the electronic device. If so, the known voice signature need not be stored on the electronic device.

The system also may include a voice signature generation application configured to cause the speaker of the electronic device to output a query or a request that the user to speak a known text passage. The system may receive a spoken response via the microphone, process the spoken audio instance to generate the known voice signature, and transmit the known voice signature to a remote server for storage. The electronic device may then delete, or at least not save, any audio recording of the spoken audio instance. Thus, the spoken audio instance will not be saved on the electronic device.

In an alternate embodiment, a method of authenticating a user to an electronic device includes determining that a microphone of an electronic device has received a spoken audio input, and using the spoken audio input to identify a user. The method also includes causing the electronic device to output an audio prompt that is associated with an expected response. When it is determined that the microphone has received a spoken answer to the audio prompt, the system will analyze the spoken answer to determine whether the spoken answer corresponds to the expected response. After determining that the spoken answer corresponds to the expected response, the system will authenticate the user and provide the user with access to the electronic device or an application of the electronic device.

Optionally, before causing the electronic device to output the audio prompt, the system may determine that the user was not previously authenticated to the electronic device or to the application within a threshold time period.

Optionally, using the spoken audio input to identify the user may include: (a) analyzing the spoken audio input to detect whether the spoken audio input matches a known passphrase, and identifying a user who is associated with the known passphrase; or (b) processing the spoken audio input to determine whether the spoken audio input is consistent with a known voice signature, and identifying a user who is associated with the known voice signature.

Optionally, after identifying the user, the system may access a system usage profile for the user to determine whether the system user profile includes an indication of a security threat. If the system determines that the system user profile includes an indication of a security threat, then in response it may implement the step of causing the electronic device to output the audio prompt. Accessing the system usage profile may include determining whether the system usage profile includes one or more of the following: (a) an attempt to simultaneously access an application on more than a threshold number of devices at the same time; (b) an attempt to simultaneously use multiple devices in different geographic locations at the same time; or (c) an attempt to access an application or service that is inconsistent with a typical usage pattern for the user.

Optionally, before providing the user with the access, and in response to detecting that the spoken answer corresponds to the expected response, the system may process the spoken answer to determine whether the spoken answer is consistent with a known voice signature. If so, then it may only provide the user with the access if the spoken answer is consistent with the known voice signature.

DETAILED DESCRIPTION

Figure 1:
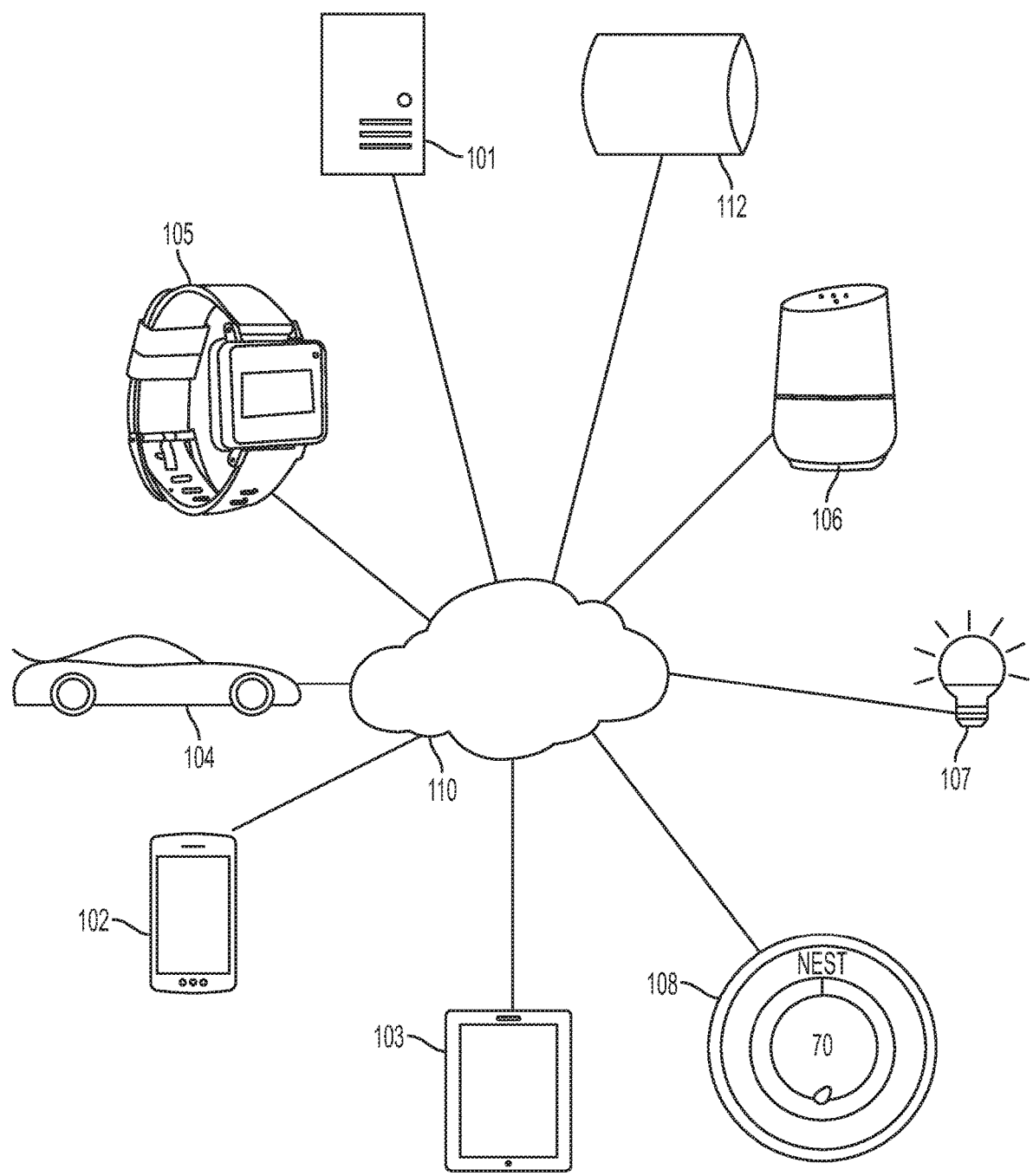
FIG. 1 illustrates an example system for verifying an account user to any number of electronic devices according to an embodiment.

Terminology that is relevant to this disclosure includes:

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

An "electronic device" or a "computing device" refers to a device or system that includes a processor and memory.

Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions. Examples of electronic devices include personal computers, servers, mainframes, virtual machines, containers, gaming systems, televisions, digital home assistants and mobile electronic devices such as smartphones, fitness tracking devices, wearable virtual reality devices, Internet-connected wearables such as smart watches and smart eyewear, personal digital assistants, cameras, tablet computers, laptop computers, media players and the like. Electronic devices also may include appliances and other devices that can communicate in an Internet-of-things arrangement, such as smart thermostats, refrigerators, connected light bulbs and other devices. Electronic devices also may include components of vehicles such as dashboard entertainment and navigation systems, as well as on-board vehicle diagnostic and operation systems. In a client-server arrangement, the client device and the server are electronic devices, in which the server contains instructions and/or data that the client device accesses via one or more communications links in one or more communications networks. In a virtual machine arrangement, a server may be an electronic device, and each virtual machine or container may also be considered to be an electronic device. In the discussion below, a client device, server device, virtual machine or container may be referred to simply as a "device" for brevity. Additional elements that may be included in electronic devices will be discussed below in the context of FIG. 5.

The terms "processor" and "processing device" refer to a hardware component of an electronic device that is configured to execute programming instructions. Except where specifically stated otherwise, the singular terms "processor" and "processing device" are intended to include both single-processing device embodiments and embodiments in which multiple processing devices together or collectively perform a process.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

FIG. 1 illustrates an example system for verifying an account user to various electronic devices according to an embodiment. As illustrated by FIG. 1, any number of client electronic devices, such as a smartphone 102, computing device 103 such as the tablet computing device shown, on-board vehicle devices 104 such as in-dashboard entertainment and navigation systems, wearable electronic devices such as smart watch 105, and connected Internet of Things devices such as home voice assistant 106, smart light bulb 107 and smart thermostat 108, communicate with each other and/or a remote server 101 via a communication network 110. The communication network 110 may be a local area network (LAN), a wide area network (WAN), a mobile or cellular communication network, an extranet, an intranet, the Internet and/or the like.

Each of the client electronic devices 102-108 will include a microphone by which the device may receive audio inputs, and in particular voice prompts from a device user. One or more of the client electronic devices and/or the server 101 may include or be in communication with one or more data stores 112. Each data store may include one or more non-transitory computer-readable media sectors in which data or other information can be stored.

In various embodiments, a user can use his or her voice as an authentication key to access an electronic device or one or more applications that the electronic device executes. To do this, the system generates a voice signature for the user by prompting the user to respond to a set of prompts on a single electronic device, and also to speak a passphrase into the electronic device. The voice signature is a unique code set that includes data about certain characteristics of the user's voice, but it does not include actual recordings of the user's voice itself. In this document, the terms "voice print" and "voice signature" are used interchangeably to refer to a voice signature. The voice signature and passphrase may be stored in a memory of the electronic device. Or, to avoid potential copying of and access to the voice signature and passphrase, either or both of these may be uploaded and stored to a data store that is remote from the electronic device in a cloud service.

Later, when the user wishes to access an application or electronic device, to verify the user's identity, the device listens (or the application causes the device to listen) for a unique passphrase to be spoken. When the passphrase is detected, the received audio signal is processed to identify certain characteristics of the audio signal, and those characteristics are cross-referenced with the user's voice signature.

If authentication is confirmed, then the electronic device may permit the user to access it or the requested application. However, if the user has not previously accessed the particular application or device, or if the user has not accessed the particular device within a threshold period of time, or if a potential security threat has been associated with the user's system usage profile (such as because a security issue was detected on the user's account since the user was last authenticated), then before granting the permission the authentication process will perform a second verification step and ask the user to speak a response to a question. The system will then parse the user's spoken response and compare the response to the user's voice signature. If the response is consistent with the user's voice signature, the system will then authenticate the user to the device. Alternatively, the second verification step (or an additional verification step) may be to use a near field communication (NFC) receiver of the device to detect whether another device that is known to be associated with the user is within a detection range of the NFC receiver, by determining whether it can receive a signal from the associated device.

Figure 2:
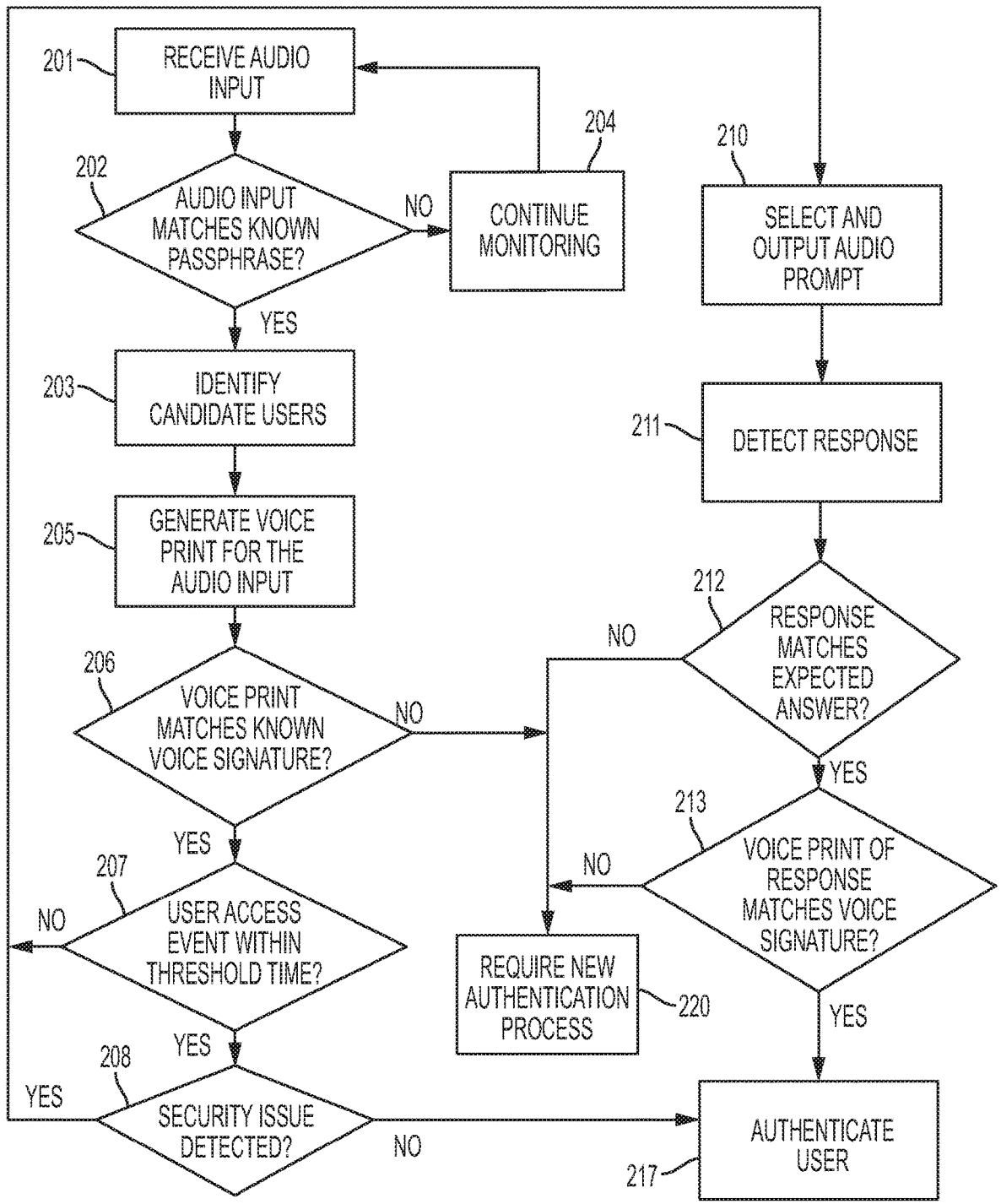
FIG. 2 is a flow chart of an example method of authenticating a user with a two-step voice authentication process.

An example process flow for authenticating a user to an electronic device is shown in FIG. 2. In various embodiments, a processor of an electronic device will execute an authentication application, which is a set of programming instructions that include a rule set and/or parameters for determining whether a user is authorized to access an electronic device or one or more applications that are available to the user on the electronic device. The method will include causing a microphone of the electronic device to receive a spoken audio input 201. Optionally, before causing the microphone to receive the spoken audio input, the system may output a visual or audio prompt to ask the user to provide the spoken audio input 201, or the system may receive a physical command from the user, such as a touch of a touchscreen activation area, a power button and/or a voice activation switch. Alternatively, the system may simply maintain its audio speaker in an "always on" mode so that it continuously listens for the passphrase without first prompting the user or receiving a physical command from the user.

The device may require that the user speak a known passphrase before it will authenticate the user to the device or its application. If so, then the system may analyze the audio input to detect whether the audio input matches a known passphrase 202. The system may do this by any suitable speech recognition process, such as by using a speech-to-text converter and comparing the resulting word or phrase to a data set of known passphrases that have been previously used to access the electronic device or the application. To authenticate the user to the device, the system may require that (among other criteria) the spoken passphrase match one of the known passphrases. The known passphrases may be stored locally on the device, or the known passphrases may be stored remotely on a server that is running an authentication application. Known passphrases may be stored in combination with user profiles, so that the system can identify a candidate user (or set of candidate users) as a first level of analysis 203. Candidate users are those users having a user profile that includes or is associated with the spoken passphrase.

If the audio input does not match a known passphrase, the device will continue monitoring the environment via the microphone until it detects a known passphrase 204.

When the system detects that an audio input matches a known passphrase, the system will also process the audio input to generate a voice print for the audio input 205. The system will then determine whether the voice print for the audio input is consistent with a known voice signature that is stored in a user profile 206. The system may generate voice prints and determine whether a spoken phrase is consistent with a voice print. Methods of generating voice prints and determining consistency are known to those of skill in the art, such as those disclosed in U.S. Pat. Nos. 9,595,260 and 9,398,128, the disclosures of which are incorporated into this document by reference. The embodiments of this disclosure may use any now or hereafter known voice print generation and matching process. The system may initially compare the voice print to the voice signatures of those users who were identified as candidate users in step 203. If there are no matches in the set of candidate users, the system also may compare the voice print to voice signatures of one or more other users for whom the system has user profiles that contain voice signatures. The system may select the other users using any suitable criteria, such as users who are known prior users of the electronic device.

If the system cannot identify any user having a voice signature that matches the audio input's voice print, then the system may deny 220 the user access to the application or device until the user authenticates himself or herself to the device, such as by physically entering or speaking a username and password, or by presenting a biometric identifier such as a fingerprint or retina scan to a scanner of the electronic device, or by presenting a physical token.

On the other hand, if the system determines that the audio input is consistent with a known voice signature 206, then the system may identify the user whose profile includes the known voice signature. The system may also extract data from the user profile or another memory segment of a data store and use that data to determine, based on the user's usage history that is stored in the profile or other memory segment, whether the user last performed one or more qualifying access events within a threshold time period 207. A qualifying access event may include using the same electronic device (optionally with the same application or a different application), or using the same application on a different known electronic device), or some other action. If the user whose profile includes the known voice signature performed a qualifying access event within the threshold time period, the system may grant the user access to the application or the electronic device 217 and thus permit the user to access the device or application. If the system cannot identify a voice signature that corresponds to a known user, or if there is a match but the user did not perform a qualifying access event within the threshold time period, the system may require the user to perform a second level authentication process, which will be described below.

Optionally, the system may implement one or more additional rules that establish criteria for deciding whether to grant the user access or require the user to perform the second level authentication process. For example, the authentication application may extract data from the user's system usage profile to determine whether the system usage profile indicates that a potential security threat has been posted to the user's system usage profile or otherwise occurred within a threshold time period 208. Examples of security issues that can result in a security threat being posted include detection of an attempt to access an application on more than a threshold number of devices at the same time, detection of an attempt to use multiple devices in different geographic locations at the same time, or detection of an attempt to access an application or service that is inconsistent with the user's typical usage pattern (such as detecting an access attempt in a country where the user had not previously done so). The system usage profile may be a component of the user profile described above, or it may be a separate profile that is stored in a separate memory segment or memory device.

If the system determines that the user should undergo a second level authentication process before granting the user access, the system may select an audio prompt and cause a speaker of the electronic device to output the audio prompt to the user 210. The prompt will be a question, statement or phrase that is associated with an expected response, and will be stored in the user's profile or be based on data that is contained in the user's profile. For example, the prompt may be a question such as "what is your favorite movie" or "what was your first pet's name," and the response may be stored in the user's profile. The question may be randomly selected from a set of candidate questions, or questions may be selected from a candidate set using any suitable criteria, such as selecting a question that was not previously asked within a threshold period of time or in a threshold number of most recent previous questions. The question may require the user to perform a spoken task, such as to speak an additional passphrase or security code.

The system may receive, via a microphone of the electronic device, a spoken response to the prompt 211. The authentication application will then process the spoken response to determine whether it matches the expected response 212, using any suitable speech recognition technology such as those previously described. In some embodiments, the system may output multiple prompts, and the user may be required to select one or more of them, or select all of them.

If the spoken response for each presented prompt matches the expected response, the system may authenticate the user and permit the user to access the device or application 217. If the spoken response does not match the expected response, the authentication application may deny 220 the user access to the application or device until the user provides additional authentication credentials. Alternatively, the authentication application may select and output one or more different questions until either the user provides a correct expected response (in which case the authentication application will grant access) or a threshold number of questions have been presented and not correctly answered (in which case the authentication application will deny access).

Optionally, the system also may generate a voice print of the user's answer to each prompt in the second level authentication process, and the system may compare the voice print to the voice signature that is contained in the user's profile 213. If this happens, the authentication application may also require that the voice print of the response match the voice signature before it will grant the user access 214. Otherwise, it may deny 220 the user access to the application or device until the user provides an additional valid authentication credential.

Figure 3:
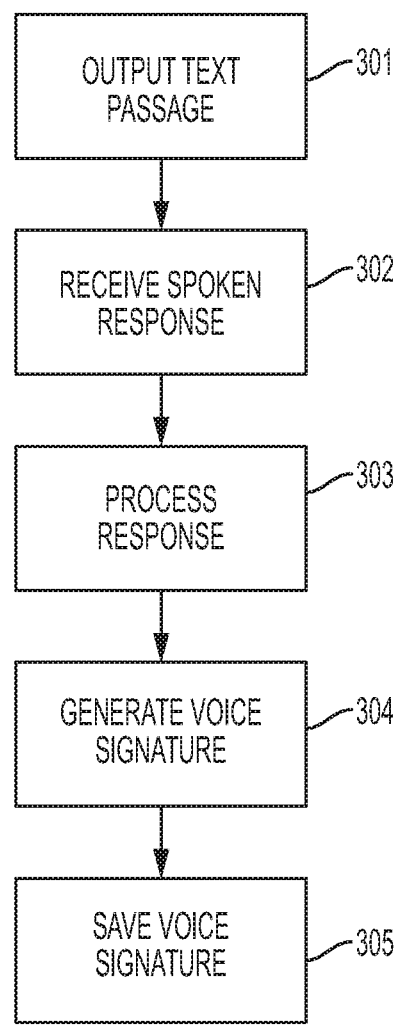
FIG. 3 illustrates a process of generating a voice signature.

Before implementing the processes described in FIG. 2, the system may generate and store the voice signature, as well as the prompts and their associated expected responses. FIG. 3 describes processes that the system may follow to do this. Referring to FIG. 3, a processor of an electronic device, executing a voice signature generation application that outputs a prompt that requests the user to speak a known text passage 301. The electronic device may be the same device or a different device as those used in the authentication processes of FIG. 2. The text passage will be retrieved from a memory that is accessible by the voice signature generation application, or contained in a rule set of the voice signature generation application. The voice signature generation application may output this text passage by displaying it on a display screen of an electronic device, by causing a speaker of an electronic device to output it as spoken words, by causing a printer to print it, by sending it to the user's messaging system address in an electronic message, or by some other means. The system will then receive a spoken audio instance of the known text passage 302 and process the spoken audio instance 303 using now or hereafter known processes such as those described above to generate the known voice signature 304. The electronic device will then transmit the known voice signature to a remote server for storage so that other electronic devices can access it for their authentication processes 305. The voice signature may be saved as part of, or in association with, a user profile for the user. The system will not transmit any audio recording of the user's speaking of the text passage to the remote server. In some embodiments, even the electronic device may delete the spoken response after processing is complete so that an actual audio recording of the user speaking is archived.

Figure 4:
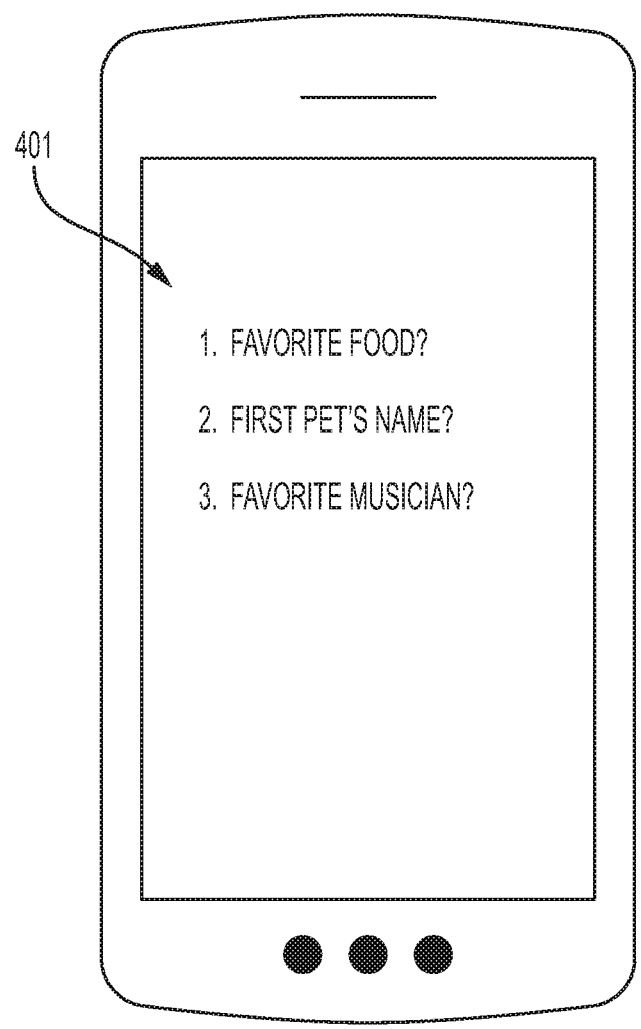
FIG. 4 illustrates how an authentication application may build a user profile with second-level authentication questions and expected responses.

Optionally, before analyzing the spoken audio input the system may also generate or supplement the user profile to obtain a set of prompts and expected responses. This may be done using any suitable method. For example, referring to FIG. 4, the authentication application may cause an electronic device user interface 401 to output a list, drop-down menu, or other structure containing candidate questions. The user may select questions from the candidate set and provide answers that will be saved and used as expected answers. The system will save the text of each answer to the user's profile. Alternatively, the system may generate questions and expected answers based on data that is stored in the user's system usage profile, such as "when did you last use this application?" or "what was the last song you listened to on this electronic device'?" As another alternative, the system may provide the user an ability to enter questions and answers as freeform text or spoken words.

Figure 5:
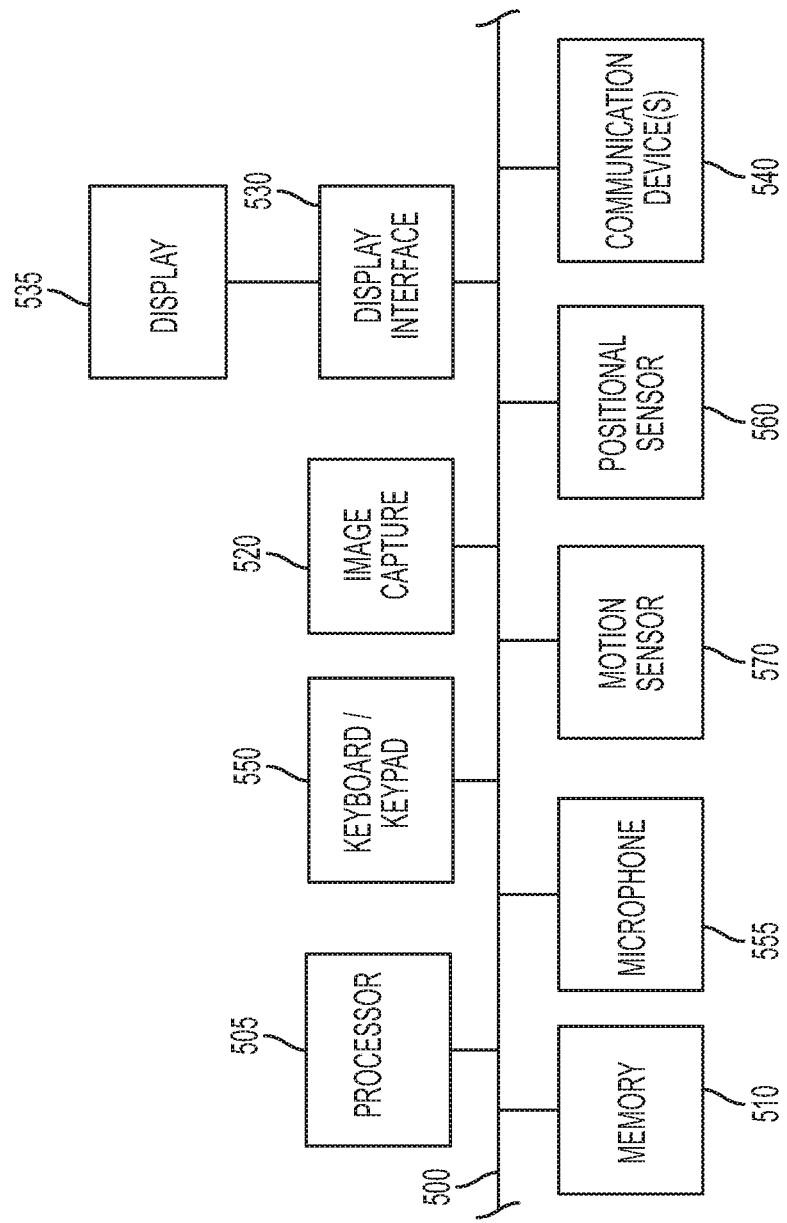
FIG. 5 depicts a block diagram of hardware that may be used to contain or implement program instructions.

FIG. 5 depicts a block diagram of hardware that may be used to contain or implement program instructions, such as those of a hosted service, a monitoring service for a hosted service, an electronic device that is accessing a hosted service, or a virtual machine or container that serves in any of these roles. A bus 500 serves as an information highway interconnecting the other illustrated components of the hardware. The bus may be a physical connection between elements of the system, or a wired or wireless communication system via which various elements of the system share data. Processor 505 is a processing device of the system performing calculations and logic operations required to execute a program. Processor 505, alone or in conjunction with one or more of the other elements disclosed in FIG. 5, is an example of a processing device, computing device or processor as such terms are used within this disclosure. The processing device may be a physical processing device, a virtual device contained within another processing device, or a container included within a processing device.

A memory device 510 is a hardware element or segment of a hardware element on which programming instructions, data, or both may be stored. Read only memory (ROM) and random access memory (RAM) constitute examples of memory devices, along with cloud storage services.

An optional display interface 530 may permit information to be displayed on the display 535 in audio, visual, graphic or alphanumeric format. Communication with external devices, such as a printing device, may occur using various communication devices 540, such as a communication port or antenna. A communication device 540 may be communicatively connected to a communication network, such as the Internet or an intranet.

The hardware may also include a user input such as a keyboard or keypad 550, or other input device such as a mouse, a touch pad, a touch screen, a remote control, a pointing device, or a video input device. The hardware also may include a microphone 555 for receipt of voice and other audio inputs. Data also may be received from an image capturing device 520 such as a digital camera or video camera. A positional sensor 560 and/or motion sensor 570 may be included to detect position and movement of the device. Examples of motion sensors 570 include gyroscopes or accelerometers. Examples of positional sensors 560 such as a global positioning system (GPS) sensor device that receives positional data from an external GPS network.

The processes described above can help electronic devices authenticate a user to an account without requiring the user to enter a password or use a physical key. An alternative use could be to unlock or activate physical security to a building or vehicle. It could also be used to verify someone's identity over the phone when dealing with medical or financial information. Multiple passkeys could be stored in the data store so that a randomly chosen challenge question can be solved by a user as the second level authentication. The use of voice recognition can also enable multiple users to be authenticated to a single device, so long as voice prints for each user are generated and stored by the authentication system.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of authenticating a user to an electronic device, the method comprising:
by a processor of the electronic device, executing an authentication application by:
causing a microphone of the electronic device to receive a spoken audio input;
analyzing the spoken audio input to detect whether the spoken audio input matches a known passphrase, wherein the known passphrase is included in a plurality of user profiles, wherein each user profile is associated with a respective user of a plurality of candidate users;
upon detecting that the spoken audio input matches the known passphrase included in the plurality of user profiles, comparing the spoken audio input with voice signatures in each of the plurality of user profiles;
identifying, based on the comparing of the spoken audio input with the voice signatures, a user among the plurality of candidate users with a voice signature in the user's profile consistent with the spoken audio input;
determining whether the user performed one or more qualifying access events within a threshold time period of receipt of the spoken audio input;
implementing one or more rules to decide between (i) providing the user with access to the electronic device based on the determination that the user performed the one or more qualifying access events within the threshold time period and (ii) requiring the user to undergo a second level authentication process;
in response to determining that the user should undergo the second level authentication process, performing the second level authentication process by:
causing the electronic device to select a query among a plurality of queries in a profile of the user, wherein the query is associated with an expected response and has not been previously asked within a threshold period of time,
causing the electronic device to output an audio prompt based on the selected query,
causing the microphone to receive a spoken answer to the audio prompt,
analyzing the spoken answer to determine whether the spoken answer corresponds to the expected response, and
after deciding to provide the user with access or determining that the spoken answer corresponds to the expected response, authenticating the user and providing the user with access to the electronic device.

2. The method of claim 1 wherein:
implementing the rules to decide whether to require the user to undergo the second level authentication process comprises determining whether the user was previously authenticated to the electronic device, or to a selected application of the electronic device, within a threshold time period; and
wherein determining that the user should undergo the second level authentication process comprises determining that the user was not previously authenticated to the electronic device or the selected application within the threshold time period.

3. The method of claim 1 wherein:
implementing the rules to decide whether to require the user to undergo the second level authentication process comprises accessing a system usage profile for the user to determine whether the system usage profile includes an indication of a security threat; and
wherein causing the electronic device to output the audio prompt is performed in response to determining that the system usage profile includes an indication of a security threat.

4. The method of claim 3, wherein accessing the system usage profile for the user to determine whether the system usage profile includes an indication of a security threat comprises determining whether the system usage profile includes one or more of the following:
an attempt to simultaneously access an application on more than a threshold number of devices at the same time;
an attempt to simultaneously use multiple devices in different geographic locations at the same time; or
an attempt to access an application or service that is inconsistent with a typical usage pattern for the user.

5. The method of claim 1 further comprising, before providing the user with the access:
in response to detecting that the spoken answer corresponds to the expected response, processing the spoken answer to determine whether the spoken answer is consistent with the voice signature in the user's profile; and
only providing the user with the access if the spoken answer is consistent with the voice signature in the user's profile.

6. The method of claim 1 further comprising, before identifying the user, generating the voice signature in the user's profile by:
executing a voice signature generation application that:
requests the user to speak a known text passage,
receives a spoken audio instance of the known text passage,
processes the spoken audio instance to generate the voice signature,
transmits the voice signature to a remote server for storage, and
deletes or does not save any audio recording of the spoken audio instance.

7. The method of claim 6, wherein the electronic device that executes the authentication application and the electronic device that executes the voice signature generation application are separate physical devices.

8. The method of claim 1 further comprising, before identifying the user, generating the voice signature in the user's profile by:
executing a voice signature generation application that:
outputs a query,
receives a spoken response to the query,
processes the spoken response to yield the voice signature,
transmits the voice signature to a remote server for storage, and
deletes or does not save any audio recording of the spoken response so that the spoken response is not saved on the electronic device.

9. The method of claim 1, further comprising:
generating the profile for the user by:
outputting the plurality of queries,
receiving a plurality of audio replies to the queries,
processing the replies to identify text contained in each of the audio replies, and saving, to a remote server, the profile comprising the identified text for each reply in association with the reply's corresponding query; and when analyzing the spoken answer to determine whether the spoken answer corresponds to the expected response, determining whether the spoken answer corresponds to the identified text for the reply that corresponds to the selected query.

10. An electronic device user authentication system, comprising:

an electronic device comprising a microphone, a speaker and a memory containing an authentication application that, when executed by one or more processors, is configured to:

cause the microphone to receive an audio input;

cause the one or more processors to analyze the audio input to detect whether the audio input matches a known passphrase, wherein the known passphrase is included in a plurality of user profiles, wherein each user profile is associated with a respective user of a plurality of candidate users;

cause the one or more processors to, upon detecting that the spoken audio input matches the known passphrase included in the plurality of user profiles, compare the spoken audio input with voice signatures in each of the plurality of user profiles;

cause the one or more processors to identify, based on the comparing of the spoken audio input with the voice signatures, a user among the plurality of candidate users with a voice signature in the user's profile consistent with the spoken audio input;

determine whether the user performed one or more qualifying access events within a threshold time period of receipt of the audio input;

implement one or more rules to decide between (i) providing the user with access to the electronic device based on the determination that the user performed the one or more qualifying access events within the threshold time period and (ii) requiring the user to undergo a second level authentication process;

in response to determining that the user should undergo the second level authentication process, perform the second level authentication process by:

causing the electronic device to select a query among a plurality of queries in a profile of the user, wherein the query is associated with an expected response and has not been previously asked within a threshold period of time, causing the speaker of the electronic device to output an audio prompt based on the selected query, and after the microphone receives a spoken answer in response to the audio prompt, causing the one or more processors to analyze the spoken answer to determine whether the spoken answer corresponds to the expected response; and after deciding to provide the user with access or determining that the spoken answer corresponds to the expected response, cause the one or more processors to authenticate the user so that the user may access one or more functions of the electronic device.

11. The electronic device user authentication system of claim 10, wherein:

the one or more rules to decide whether to require the user to undergo the second level authentication process comprise rules to access a profile for the user to determine whether the profile includes an indication that the user was not previously authenticated to the electronic device or to a selected application of the electronic device within a threshold time period; and determining that the user should undergo the second level authentication process comprises determining that the profile includes an indication that the user was not previously authenticated within the threshold time period.

12. The electronic device user authentication system of claim 10, wherein:

the one or more rules to decide whether to require the user to undergo the second level authentication process comprise rules to access a profile for the user to determine whether the profile includes an indication of a security threat; and determining that the user should undergo the second level authentication process comprises determining that the profile includes an indication of a security threat.

13. The electronic device user authentication system of claim 10, wherein:

the one or more processors are one or more components of a server that is remote from the electronic device and in communication with the electronic device; and the voice signatures are not stored on the electronic device.

14. The electronic device user authentication system of claim 10, further comprising additional instructions that are configured to cause the one or more processors to, before providing the user with the access:

in response to detecting that the spoken answer corresponds to the expected response, process the audio input to determine whether the spoken answer is consistent with the voice signature in the user's profile; and only provide the user with the access if the spoken answer is consistent with the voice signature in the user's profile.

15. The electronic device user authentication system of claim 10, further comprising a voice signature generation application configured to cause the electronic device to:

cause the speaker of the electronic device to output a query or a request that the user to speak a known text passage;

receive, via the microphone, a spoken response;

process the spoken response to generate the voice signature;

transmit the voice signature to a remote server for storage, and delete or not save any audio recording of the spoken response so that the spoken response is not saved on the electronic device.

16. A method of authenticating a user to an electronic device, the method comprising:

by a processor:

determining that a microphone of an electronic device has received a spoken audio input;

determining that the spoken audio input matches a known passphrase, wherein the known passphrase is included in a plurality of user profiles, wherein each user profile is associated with a respective user of a plurality of candidate users, upon determining that the spoken audio input matches the known passphrase included in the plurality of user profiles, comparing the spoken audio input with voice signatures in each of the plurality of user profiles;

identifying, based on the comparing of the spoken audio input with the voice signatures, a user among the plurality of candidate users with a voice signature in the user's profile consistent with the spoken audio input;

determining whether the user performed one or more qualifying access events within a threshold time period of receipt of the spoken audio input;

implementing one or more rules to decide between (i) providing the user with access to the electronic device based on the determination that the user performed the one or more qualifying access events within the threshold time period and (ii) requiring the user to undergo a second level authentication process;

in response to determining that the user should undergo the second level authentication process, performing the second level authentication process by:
- causing the electronic device to select a query among a plurality of queries in a profile of the user, wherein the query is associated with an expected response and has not been previously asked within a threshold period of time,
- causing the electronic device to output an audio prompt based on the selected query,
- determining that the microphone has received a spoken answer to the audio prompt, and
- analyzing the spoken answer to determine whether the spoken answer corresponds to the expected response; and after deciding to provide the user with access or determining that the spoken answer corresponds to the expected response, authenticating the user and providing the user with access to the electronic device or an application of the electronic device.

17. The method of claim 16, wherein:

implementing the one or more rules to decide whether to require the user to undergo the second level authentication process comprises determining that the user has not been previously authenticated to the electronic device or to the application within a threshold time period.

18. The method of claim 16, wherein implementing the one or more rules to decide whether to require the user to undergo the second level authentication process comprises:
- accessing a system usage profile for the user to determine whether the system usage profile includes an indication of a security threat; and
- determining that the system usage profile includes an indication of a security threat.

19. The method of claim 18, wherein accessing the system usage profile for the user to determine whether the system usage profile includes an indication of a security threat comprises determining whether the system usage profile includes one or more of the following:
- an attempt to simultaneously access an application on more than a threshold number of devices at the same time;
- an attempt to simultaneously use multiple devices in different geographic locations at the same time; or
- an attempt to access an application or service that is inconsistent with a typical usage pattern for the user.

20. The method of claim 16 further comprising, before providing the user with the access:
- in response to detecting that the spoken answer corresponds to the expected response, processing the spoken answer to determine whether the spoken answer is consistent with the voice signature in the user's profile; and
- only providing the user with the access if the spoken answer is consistent with the voice signature in the user's profile.

* * * * *